(12) United States Patent
Nie et al.

(10) Patent No.: US 12,283,125 B2
(45) Date of Patent: Apr. 22, 2025

(54) METHOD FOR CAPTURING FINGERPRINT IMAGE, APPARATUS FOR CAPTURING FINGERPRINT IMAGE, AND ELECTRONIC DEVICE

(71) Applicant: SHENZHEN GOODIX TECHNOLOGY CO., LTD., Shenzhen (CN)

(72) Inventors: Hongsong Nie, Shenzhen (CN); Ke Zhang, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 12 days.

(21) Appl. No.: 18/501,163

(22) Filed: Nov. 3, 2023

(65) Prior Publication Data

US 2024/0078834 A1 Mar. 7, 2024

Related U.S. Application Data

(63) Continuation of application No. PCT/CN2021/099016, filed on Jun. 8, 2021.

(51) Int. Cl.
*G06V 40/13* (2022.01)
*G06V 10/60* (2022.01)
(Continued)

(52) U.S. Cl.
CPC .............. *G06V 40/13* (2022.01); *G06V 10/60* (2022.01); *G06V 40/1359* (2022.01); *G09G 3/32* (2013.01);
(Continued)

(58) Field of Classification Search
CPC .......................................... G06V 40/12–1394
See application file for complete search history.

(56) References Cited

U.S. PATENT DOCUMENTS 11,662,346 B2 * 5/2023 Swager ................ G06K 19/14
250/459.1
11,810,390 B2 * 11/2023 Qing .................. G06V 40/1318
(Continued)

FOREIGN PATENT DOCUMENTS

| CN | 107636686 A | 1/2018 |
| CN | 109740528 A | 5/2019 |

(Continued)

OTHER PUBLICATIONS

Wenhao Sun, Channel Estimation and LDPC Decoding of NAND Flash Memory System, China Excellent Master's Degree Thesis Full Text Database (Master's) Information Technology Series, vol. 5, 2021,May 15, 2021.

(Continued)

*Primary Examiner* — Patrick F Marinelli
(74) *Attorney, Agent, or Firm* — Emerson, Thomson & Bennett, LLC; Roger D. Emerson; Peter R. Detorre

(57) ABSTRACT

Embodiments of the present disclosure provide a method for capturing a fingerprint image, an apparatus for capturing a fingerprint image, and an electronic device, where the method includes: controlling a fingerprint sensor to capture at least one frame of image based on each candidate exposure time among N candidate exposure times respectively; determining N values of a feature parameter corresponding to the N candidate exposure times according to the at least one frame of image captured in each exposure time, where the feature parameter is used to indicate a degree of influence of a refresh period of a display screen on the fingerprint image captured by the fingerprint sensor; determining a candidate exposure time corresponding to a first value indicating a smallest degree of influence among the N values as a target exposure time; and controlling the fingerprint (Continued)

sensor to capture the fingerprint image based on the target exposure time.

20 Claims, 7 Drawing Sheets

(51) Int. Cl.
*G06V 40/12* (2022.01)
*G09G 3/32* (2016.01)
*H04N 23/73* (2023.01)

(52) U.S. Cl.
CPC ......... *H04N 23/73* (2023.01); *G09G 2354/00* (2013.01)

(56) References Cited

U.S. PATENT DOCUMENTS

| | | | |
|---|---|---|---|
| 2018/0189540 A1 | 7/2018 | Chang et al. | |
| 2019/0012517 A1 | 1/2019 | Li | |
| 2020/0175248 A1 | 6/2020 | Wu et al. | |
| 2021/0116376 A1* | 4/2021 | Swager | C09K 11/06 |
| 2022/0319226 A1* | 10/2022 | Qing | G06V 10/141 |
| 2024/0062718 A1* | 2/2024 | Karri | G06V 40/1318 |
| 2024/0078834 A1* | 3/2024 | Nie | G06V 40/13 |

FOREIGN PATENT DOCUMENTS

| | | |
|---|---|---|
| CN | 110210364 A | 9/2019 |
| CN | 110945526 A | 3/2020 |
| CN | 112289271 A | 1/2021 |
| CN | 112668425 A | 4/2021 |

OTHER PUBLICATIONS

WeiLi et al. Privacy-Aware Sensing-Quality-Based Budget Feasible Incentive Mechanism for Crowdsourcing Fingerprint Collection, IEEE Access, vol. 8, Feb. 18, 2020.

PCT International search report of PCT/CN2021/099016, issued on Feb. 24, 2022.

* cited by examiner

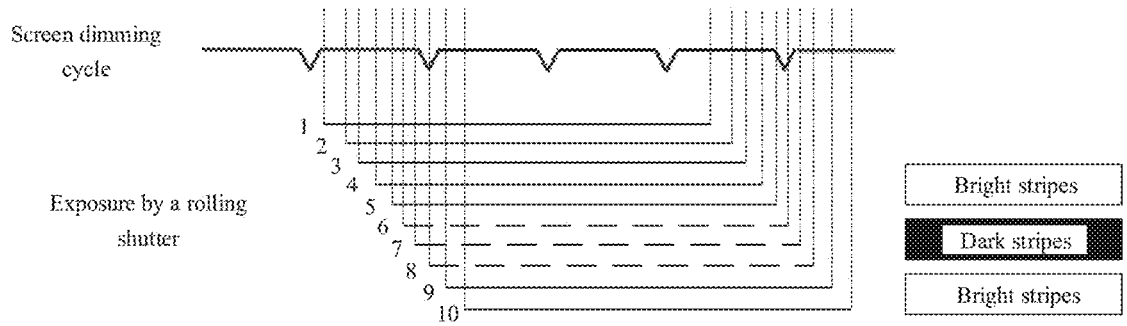

Controlling the fingerprint sensor to capture at least one frame of image based on each candidate exposure time among N candidate exposure times respectively, the N candidate exposure times including a first exposure time greater than a preset exposure time, a second exposure time shorter than the preset exposure time, and the preset exposure time, where a difference between the first exposure time and the preset exposure time and a difference between the preset exposure time and the second exposure time are each a positive integer multiple of a preset step size, and N is a positive integer greater than or equal to 3 — S410

Determining N values of a feature parameter corresponding to the N candidate exposure times according to the at least one frame of image captured in each exposure time, where the feature parameter is used to indicate a degree of influence of a refresh period of a display screen on a fingerprint image captured by the fingerprint sensor — S420

Determining a candidate exposure time corresponding to a first value indicating a smallest degree of influence among the N values for use as a target exposure time — S430

Controlling the fingerprint sensor to capture the fingerprint image based on the target exposure time — S440

Fig. 4

METHOD FOR CAPTURING FINGERPRINT IMAGE, APPARATUS FOR CAPTURING FINGERPRINT IMAGE, AND ELECTRONIC DEVICE

CROSS REFERENCE TO RELATED APPLICATIONS

The present application is a continuation of international application No. PCT/CN2021/099016, filed on Jun. 8, 2021, which is hereby incorporated by reference in its entirety.

TECHNICAL FIELD

Embodiments of the present disclosure relates to the field of fingerprint capture, and more specifically relates to a method for capturing a fingerprint image, an apparatus for capturing a fingerprint image, and an electronic device.

BACKGROUND

With the growing demand for full screen in mainstream markets, move more front-placed devices, such as a proximity sensor and an ambient light sensor, need to be moved under screen. When the ambient light sensor is arranged under a display screen of an electronic device, the ambient light sensor needs to detect a light intensity of ambient light penetrating through the display screen. In order to avoid influence of screen light on detection accuracy, the ambient light sensor needs to work properly only when the screen is completely turned off. In order to improve the accuracy of ambient light detection, a drop amplitude of the display screen during a dark period within a dimming period generally will be reduced, thereby affecting capture of a fingerprint image by a fingerprint sensor under the display screen, and reducing fingerprint detection performance.

SUMMARY

Embodiments of the present disclosure provide a method for capturing a fingerprint image, an apparatus for capturing a fingerprint image, and an electronic device, can reduce influence of screen drive and screen refresh on fingerprint detection, thereby improving fingerprint detection performance.

In a first aspect, a method for capturing a fingerprint image is provided, including:
controlling a fingerprint sensor to capture at least one frame of image based on each candidate exposure time among N candidate exposure times respectively, the N candidate exposure times comprising a first exposure time greater than a preset exposure time, a second exposure time shorter than the preset exposure time, and the preset exposure time, where a difference between the first exposure time and the preset exposure time and a difference between the preset exposure time and the second exposure time are each a positive integer multiple of a preset step size and less than the preset exposure time, and N is a positive integer greater than or equal to 3;
determining N values of a feature parameter corresponding to the N candidate exposure times according to the at least one frame of image captured in each exposure time, where the feature parameter is used to indicate a degree of influence of a refresh period of a display screen on the fingerprint image captured by the fingerprint sensor;
determining a candidate exposure time corresponding to a first value indicating a smallest degree of influence among the N values as a target exposure time; and
controlling the fingerprint sensor to capture the fingerprint image based on the target exposure time.

In a possible implementation, the feature parameter includes at least one of: a temporal noise, a spatial noise, a signal to noise ratio, and a horizontal stripe intensity.

In a possible implementation, the feature parameter includes a temporal noise, and the controlling the fingerprint sensor to capture the at least one frame of image based on each candidate exposure time among the N candidate exposure times respectively includes:
controlling the fingerprint sensor to capture M frames of images based on an i-th candidate exposure time among the N candidate exposure times, where M is a positive integer greater than 1, and i is a positive integer less than or equal to N; and
the determining the N values of the feature parameter corresponding to the N candidate exposure times according to the at least one frame of image captured in each exposure time includes:
acquiring a standard deviation of pixel values corresponding to a same fingerprint sensor pixel in the M frames of images; and
determining a temporal noise value corresponding to the i-th candidate exposure time according to an average value of the standard deviations corresponding to P fingerprint sensor pixels, where P is a positive integer greater than 1.

In a possible implementation, the feature parameter includes a spatial noise, and the controlling the fingerprint sensor to capture the at least one frame of image based on each candidate exposure time among the N candidate exposure times respectively includes:
controlling the fingerprint sensor to capture M frames of images based on an i-th candidate exposure time among the N candidate exposure times, where M is a positive integer greater than 1, and i is a positive integer less than or equal to N; and
the determining the N values of the feature parameter corresponding to the N candidate exposure times according to the at least one frame of image captured in each exposure time includes:
acquiring an average value of pixel values corresponding to a same fingerprint sensor pixel in the M frames of images; and
determining a spatial noise value corresponding to the i-th candidate exposure time according to a standard deviation of the average values corresponding to P fingerprint sensor pixels, where P is a positive integer greater than 1.

In a possible implementation, the feature parameter includes a horizontal stripe intensity, and the controlling the fingerprint sensor to capture the at least one frame of image based on each candidate exposure time among the N candidate exposure times respectively includes:
controlling the fingerprint sensor to capture Q frames of images based on an i-th candidate exposure time among the N candidate exposure times, where Q is a positive integer, and i is a positive integer less than or equal to N; and
the determining the N values of the feature parameter corresponding to the N candidate exposure times according to the at least one frame of image captured in each exposure time includes:

determining a horizontal stripe intensity value corresponding to the i-th candidate exposure time according to peak-to-peak values of a plurality of fingerprint sensor pixels in each frame of image among the Q frames of images.

In a possible implementation, the first value is a smallest value among the N values.

In a possible implementation, the feature parameter includes a signal to noise ratio, and the first value is a largest value among the N values.

In a possible implementation, the preset step size includes a time difference between times of completing exposure of two adjacent rows of fingerprint sensor pixels of the fingerprint sensor or a time difference between times of starting exposure of two adjacent rows of fingerprint sensor pixels of the fingerprint sensor.

In a possible implementation, the at least one frame of image is 5 frames of images.

In a second aspect, an apparatus for capturing a fingerprint image is provided, including: a processor configured to:
control a fingerprint sensor to capture at least one frame of image based on each candidate exposure time among N candidate exposure times respectively, the N candidate exposure times comprising a first exposure time greater than a preset exposure time, a second exposure time shorter than the preset exposure time, and the preset exposure time, where a difference between the first exposure time and the preset exposure time and a difference between the preset exposure time and the second exposure time are each a positive integer multiple of a preset step size and less than the preset exposure time, and N is a positive integer greater than or equal to 3;
determine N values of a feature parameter corresponding to the N candidate exposure times according to the at least one frame of image captured in each exposure time, where the feature parameter is used to indicate a degree of influence of a refresh period of a display screen on the fingerprint image captured by the fingerprint sensor;
determine a candidate exposure time corresponding to a first value indicating a smallest degree of influence among the N values as a target exposure time; and
control the fingerprint sensor to capture the fingerprint image based on the target exposure time.

In a possible implementation, the feature parameter includes at least one of: a temporal noise, a spatial noise, a signal to noise ratio, and a horizontal stripe intensity.

In a possible implementation, the feature parameter includes a temporal noise, and the processor is specifically configured to:
control the fingerprint sensor to capture M frames of images based on an i-th candidate exposure time among the N candidate exposure times, where M is a positive integer greater than 1, and i is a positive integer less than or equal to N; and
acquire a standard deviation of pixel values corresponding to a same fingerprint sensor pixel in the M frames of images; and
determine a temporal noise value corresponding to the i-th candidate exposure time according to an average value of the standard deviations corresponding to P fingerprint sensor pixels, where P is a positive integer greater than 1.

In a possible implementation, the feature parameter includes a spatial noise, and the processor is specifically configured to:
control the fingerprint sensor to capture M frames of images based on an i-th candidate exposure time among the N candidate exposure times, where M is a positive integer greater than 1, and i is a positive integer less than or equal to N; and
acquire an average value of pixel values corresponding to a same fingerprint sensor pixel in the M frames of images; and
determine a spatial noise value corresponding to the i-th candidate exposure time according to a standard deviation of the average values corresponding to P fingerprint sensor pixels, where P is a positive integer greater than 1.

In a possible implementation, the feature parameter includes a horizontal stripe intensity, and the processor is specifically configured to:
control the fingerprint sensor to capture Q frames of images based on an i-th candidate exposure time among the N candidate exposure times, where Q is a positive integer, and i is a positive integer less than or equal to N; and
determine a horizontal stripe intensity value corresponding to the i-th candidate exposure time according to peak-to-peak values of a plurality of fingerprint sensor pixels in each frame of image among the Q frames of images.

In a possible implementation, the first value is a smallest value among the N values.

In a possible implementation, the feature parameter includes a signal to noise ratio, and the first value is a largest value among the N values.

In a possible implementation, the preset step size includes a time difference between times of completing exposure of two adjacent rows of fingerprint sensor pixels of the fingerprint sensor or a time difference between times of starting exposure of two adjacent rows of fingerprint sensor pixels of the fingerprint sensor.

In a possible implementation, the at least one frame of image is 5 frames of images.

In a possible implementation, the apparatus for capturing a fingerprint image and the fingerprint sensor are encapsulated together.

In a third aspect, an electronic device is provided, including a display screen, a fingerprint sensor, and the apparatus for capturing a fingerprint image in any one implementation in the second aspect, where the fingerprint sensor is arranged under the display screen.

Based on the above technical solutions, centered on the preset exposure time, a plurality of candidate exposure times is acquired using a preset step size, a plurality of values of a feature parameter corresponding to the plurality of candidate exposure times is determined, a value corresponding to a smallest degree of influence of a refresh period of a display screen on a fingerprint image captured by a fingerprint sensor is selected from the plurality of values, a candidate exposure time corresponding to the value is determined as a target exposure time, and subsequent fingerprint capture is performed based on the target exposure time. Capturing the fingerprint image based on the target exposure time determined according to the technical solutions of the present disclosure can achieve optimal performance of the fingerprint sensor for a specific display screen, i.e., can minimize the degree of influence of the refresh period of the display screen on the fingerprint image captured by the fingerprint sensor, i.e., weakest horizontal stripes exist in the fingerprint image or no horizontal stripe exist in the fingerprint image.

BRIEF DESCRIPTION OF DRAWINGS

FIG. 3 is a schematic diagram of principal of generating horizontal stripe.

FIG. 4 is a schematic block diagram of a method for capturing a fingerprint image according to an embodiment of the present disclosure.

DETAILED DESCRIPTION OF EMBODIMENTS

Technical solutions of embodiments of the present disclosure will be described below with reference to the drawings.

At present, a high screen ratio is pursued for an electronic device, so that it is necessary to transfer more front devices to under screen, such as a proximity sensor and an ambient light sensor. In particular, when the ambient light sensor is arranged under a display screen, the ambient light sensor needs to detect a light intensity of ambient light penetrating through the display screen. Therefore, ambient light detection is very easily affected by brightness of the display screen, and thus accuracy of the ambient light detection is affected. Therefore, in order to improve the accuracy of ambient light detection of some display screens, a display mode of one of the display screens is changed by increasing a length of a bright period within a dimming period used to regulate brightness of the display screen (high duty ratio), and reducing a drop amplitude of the display screen in a dark period within each dimming period (high drop ratio). Regulation of the brightness of the display screen directly affects capture of a fingerprint image by a fingerprint sensor under the display screen, and reduces fingerprint detection performance.

Figure 1:
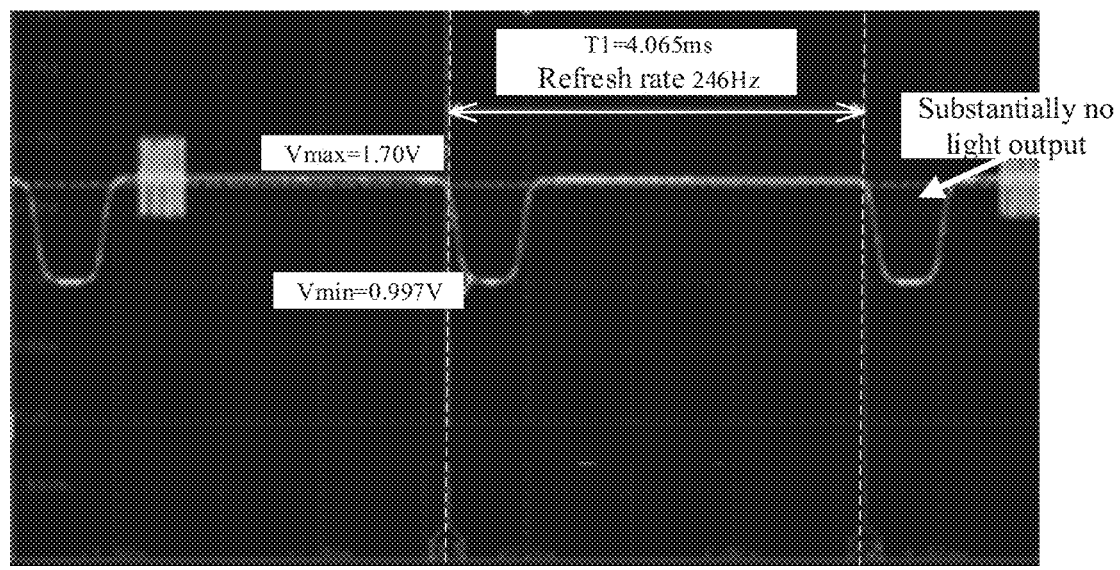
FIG. 1 is a schematic diagram of a dimming period of a display.

For example, a dimming period of a screen of a certain model is shown in FIG. 1. This dimming period is also called a drop period or a refresh period, and a dimming period comprises a bright period and a dark period. Schematically, the dimming period T1=4.065 ms, that is, a refresh rate of the display screen is 246 Hz. In the dimming period T1 shown in FIG. 1, a signal intensity Vmax=1.70V in the bright period, and a signal intensity Vmin=0.997V in the dark period. Hence, in a dark period of a dimming period, the display screen substantially has no light output, and the ambient light sensor is not affected by a light intensity of the display screen, so as to more accurately detect a light intensity of ambient light where an electronic device is currently located. However, in this case, if a user performs fingerprint detection, it is necessary to expose a pixel array in the fingerprint sensor using light emitted from the display screen, so that this display mode of the display screen will affect the fingerprint detection.

Figure 2:
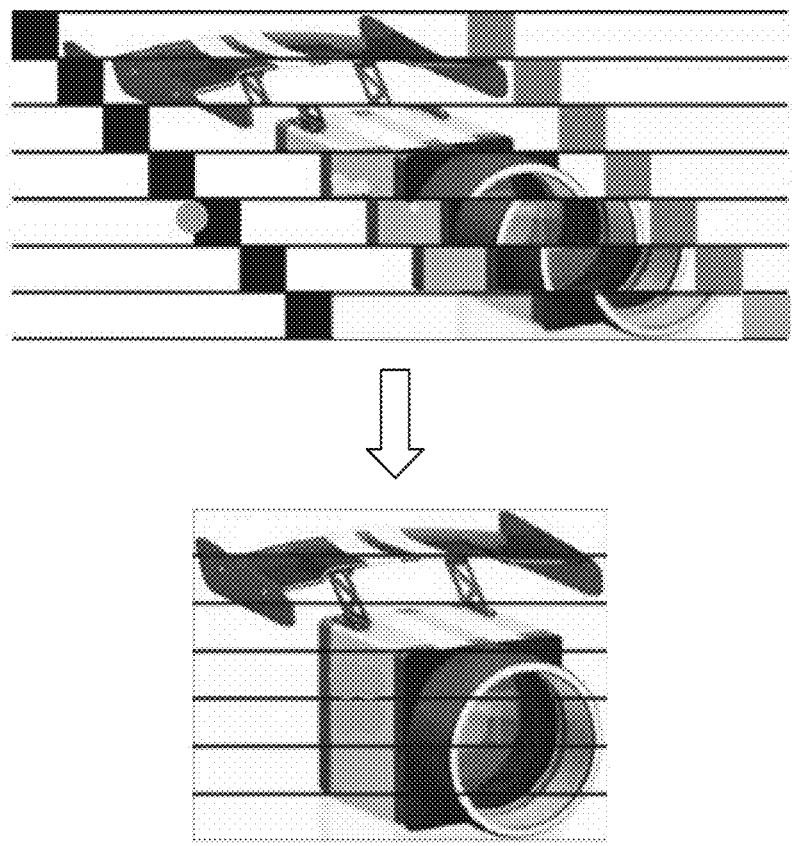
FIG. 2 is a schematic diagram of exposing each row of pixels in a rolling shutter manner.

A method for capturing a fingerprint image provided in an embodiment of the present disclosure can be applied to a fingerprint sensor using various exposure approaches, and is especially suitable for a fingerprint sensor performing exposure using a rolling shutter manner. FIG. 2 shows an exposure process using a rolling shutter manner. A fingerprint sensor array includes M rows×N columns of pixels, which is illustrated by taking M=7 in FIG. 2 as an example. As shown in FIG. 2, pixels in a same row of a pixel array are simultaneously exposed, and after the exposure of the pixels in this row for a certain period of time, pixels in a next row are simultaneously exposed. Then, pixels in each subsequent row are sequentially exposed. A time difference between starting moments of exposure of pixels in two adjacent rows, for example, may usually be equal to a data reading duration of pixels in one row, so that reading durations of exposed data in different pixel rows do not overlap. Then, exposed data of pixels in M rows is processed and spliced to form a complete image.

An exposure time of one row of pixels in a pixel array of a fingerprint sensor is, for example, usually greater than 30 ms, while an exposure time of the entire pixel array in current applications has reached 100 ms, and a dimming period of a display screen is usually, e.g., 16.6 ms, 8.3 ms, or 4.1 ms. Hence, an exposure time of pixels in a row or the pixel array is often greater than the dimming period of the display screen. Exposure is a process in which pixels superimpose, i.e., integrate, light received within the exposure time. If some pixel rows happen to encounter the display screen dimming its brightness in the light integration process, the pixel rows fail to receive light during a dark period of the dimming period, thereby resulting in small data of the pixel rows. That is, from the beginning of exposure to the completion of exposure, the number of dark periods encountered by some rows in the pixel array is different from the number of dark periods encountered by other rows. As shown in FIG. 3, one more dark period will be encountered by 6th row to 8th row than other pixel rows, thereby resulting in different photon integration of the fingerprint sensor, and forming horizontal stripes on the fingerprint image.

In an ideal state, when an exposure time of pixels in a row is an integer multiple of the dimming period of the display screen, because a length of a bright period and a length of a dark period included in an exposure time of each pixel are equal, a level of data obtained by integrating pixels in each row is substantially same, and the data will be free from horizontal stripes. However, a dimming system and a fingerprint detection system of the display screen are two independent systems, and use their own clocks, which are not absolutely accurate in different environments, even when the clocks leave their factories. Moreover, clocks of an electronic device will also have uncertain offset in a use process, so that deviation of the exposure time is an integer multiple of the dimming period of the display screen, thereby failing to eliminate horizontal stripes. The more the clock offset from a theoretical value is, the worse this phenomenon will be, and the stronger the noise amplitude of the horizontal stripes will become.

Therefore, an embodiment of the present disclosure provides a method for capturing a fingerprint image, which can reduce influence of screen drive and screen refresh on fingerprint detection, thereby improving fingerprint detection performance.

FIG. 4 is a schematic block diagram of a method 400 for capturing a fingerprint image according to an embodiment of the present disclosure. The method 400 shown in FIG. 4 may be executed by a processor, for example, by a main control processor of an electronic device, or executed by a microprocessor in a fingerprint identification apparatus (which may also be known as, e.g., a fingerprint identification module, a fingerprint module, or a fingerprint apparatus), i.e., an apparatus for executing the method 400 for capturing a fingerprint image according to an embodiment of the present disclosure may be encapsulated together with a fingerprint sensor, and an executing body of the method 400 is not limited in embodiments of the present disclosure. As show in FIG. 4, the method 400 may include some or all of the following steps:

S410: controlling the fingerprint sensor to capture at least one frame of image based on each candidate exposure time among N candidate exposure times respectively, the N candidate exposure times including a first exposure time greater than a preset exposure time, a second exposure time shorter than the preset exposure time, and the preset exposure time, where a difference between the first exposure time and the preset exposure time and a difference between the preset exposure time and the second exposure time are each a positive integer multiple of a preset step size, and N is a positive integer greater than or equal to 3.

It should be noted that after each fingerprint sensor and a specific display screen are assembled in an electronic device, a combination setting of fingerprint sensor plus display screen is generated. Generally, the electronic device will control the fingerprint sensor to capture the fingerprint image using a constant exposure time. For example, at least one exposure time is pre-stored inside the electronic device, and when the fingerprint sensor is required to capture the fingerprint image, the electronic device can invoke an exposure time therefrom and control the fingerprint sensor to capture the fingerprint image. The invoked exposure time can be understood as the preset exposure time in the present disclosure.

In an embodiment of the present disclosure, the N candidate exposure times can be acquired by a certain approach.

Optionally, the N candidate exposure times can be obtained according to a certain preset step size on the basis of the preset exposure time. Specifically, the N candidate exposure times may at least include the first exposure time, the second exposure time, and the preset exposure time, where the first exposure time is greater than the preset exposure time, the second exposure time is shorter than the preset exposure time, the difference between the first exposure time and the preset exposure time is a positive integer multiple of the preset step size and is shorter than the preset exposure time, and the difference between the preset exposure time and the second exposure time is also a positive integer multiple of the preset step size and is shorter than the preset exposure time. The preset step size may also be understood as a minimum exposure time scanning step, i.e., the first exposure time may be determined according to the difference between the first exposure time and the preset exposure time being a positive integer multiple of the preset step size, and the second exposure time may be determined according to the difference between the preset exposure time and the second exposure time being a positive integer multiple of the preset step size.

For example, if the preset exposure time is A, and the preset step size is B, the N candidate exposure times successively include A−n*B, . . . , A−2*B, A−B, A, A+B, A+2*B, . . . and A+n*B in ascending order, where n*B is less than A.

Optionally, the difference between the first exposure time and the preset exposure time is less than the preset exposure time, and the difference between the preset exposure time and the second exposure time is less than the preset exposure time, i.e., n*B is less than A.

In an embodiment, the first exposure time and the second exposure time may be centrosymmetric around the preset exposure time. In other words, the difference between the first exposure time and the preset exposure time is equal to the difference between the preset exposure time and the second exposure time.

In another embodiment, the first exposure time and the second exposure time are not centrosymmetric around the preset exposure time. That is, the difference between the first exposure time and the preset exposure time is not equal to the difference between the preset exposure time and the second exposure time. Taking the above description as an example, the first exposure time among the N candidate exposure times is A+2*B, and the second exposure time among the N candidate exposure times is A−B.

Optionally, a plurality of medians may be taken from a plurality of intervals within 0-2 times of the preset exposure time. For example, the preset exposure time is 100 ms, a median between 0 and 200 ms is 100 ms, a median between 0 and 100 ms is 50 ms, a median between 100 and 200 ms is 150 ms, a median between 0 and 50 ms is 25 ms, a median between 50 and 100 ms is 75 ms, a median between 100 and 150 ms is 125 ms, and a median between 150 ms and 200 ms is 175 ms, so that the N candidate exposure times may include, e.g., 25 ms, 50 ms, 75 ms, 100 ms, 125 ms, 150 ms, and 175 ms. The more the intervals are divided from the preset exposure time, the more the candidate exposure times are obtained, and the higher the probability of obtaining an optimal exposure time is, or the closer the finally obtained target exposure time is to the optimal exposure time.

That is, the approach of acquiring the N candidate exposure times is not limited in embodiments of the present disclosure.

After the N candidate exposure times are acquired, the fingerprint sensor can be controlled to capture at least one frame of image of a fixed object based on each candidate exposure time among the N candidate exposure times respectively.

As application scenarios of the embodiment of the present disclosure include, but are not limited to, module testing, whole machine testing, laboratory testing, and after-sales, the fixed object may be a to-be-tested finger, i.e., the at least one frame of image is a fingerprint image, or the fixed object may be other to-be-tested objects. For example, the fixed object is a to-be-tested weight, which may be made of a skin-like material with a flat surface.

It should be understood that the exposure time in the embodiment of the present disclosure may refer to an exposure time of the whole pixel array, i.e., an exposure time of one frame of image; or may refer to an exposure time of a pixel row.

S420: determining N values of a feature parameter corresponding to the N candidate exposure times according to the at least one frame of image captured in each exposure time, where the feature parameter is used to indicate a degree of influence of a refresh period of a display screen on the fingerprint image captured by the fingerprint sensor.

The feature parameter may include at least one of: a temporal noise, a spatial noise, a signal to noise ratio, and a horizontal stripe intensity. The temporal noise is used to represent a noise size of an image in a time domain, i.e., is used to indicate fluctuation of continuous multi-frame image measurement under a single press. Different frames of images have horizontal stripes at different positions, and everything else is same. When the horizontal stripes appear, the temporal noise will become larger. The spatial noise can be used to indicate flatness of an image, i.e., can be used to indicate actual flatness of a flat image in a three-dimensional space domain. When horizontal stripes appear in an image, flatness of the image will be damaged, the image will present a wave shape, and its spatial noise will become larger. The horizontal stripe intensity can be quantified by a certain approach, for example, a noise size can be measured by peak-to-peak detection. Signal to noise ratio=amount of signal/noise, where the amount of signal may refer to a useful amount of signal, and the noise may refer to any kind of noise, for example, may be a spatial noise or a temporal noise. When horizontal stripes appear, if they have a small influence on t amount of signal, they can be neglected, and the signal to noise ratio will decrease when the noise becomes larger.

The at least one of the temporal noise, the spatial noise, the signal to noise ratio, and the horizontal stripe intensity is used as the feature parameter, so that existence of the horizontal stripes can be accurately indicated, and the horizontal stripe intensity can be mapped, so that the fingerprint image captured in the obtained target exposure time will be less affected by the horizontal stripes, and then fingerprint detection performance can be improved.

S430: determining a candidate exposure time corresponding to a first value indicating a smallest degree of influence among the N values as a target exposure time.

For example, if the feature parameter is the temporal noise, an exposure time corresponding to a smallest value among the N values is determined as the target exposure time, i.e., the first value is the smallest value; if the feature parameter is the spatial noise, an exposure time corresponding to a smallest value among the N values is determined as the target exposure time, i.e., the first value is the smallest value; if the feature parameter is the horizontal stripe intensity, an exposure time corresponding to a smallest value among the N values is determined as the target exposure time; and if the feature parameter is the signal-to-noise ratio, an exposure time corresponding to a largest value among the N values is determined as the target exposure time.

After the target exposure time is selected, further, step S440: controlling the fingerprint sensor to capture the fingerprint image based on the target exposure time. Specifically, the fingerprint sensor can perform exposure using a Rolling Shutter in the target exposure time.

Therefore, the method for capturing a fingerprint image in embodiments of the present disclosure acquires a plurality of candidate exposure times centered on a preset exposure time using a preset step size, determines a plurality of values of a feature parameter corresponding to the plurality of candidate exposure times, selects a value corresponding to a smallest degree of influence of a refresh period of a display screen on a fingerprint image captured by a fingerprint sensor from the plurality of values, determines a candidate exposure time corresponding to the value as a target exposure time, and performs subsequent fingerprint capture based on the target exposure time. Capturing fingerprint image based on the target exposure time determined according to the embodiments of the present disclosure can achieve optimal performance of the fingerprint sensor for a specific display screen, i.e., minimize the degree of influence of the refresh period of the display screen on the fingerprint image captured by the fingerprint sensor, i.e., weakest horizontal stripes exist in the fingerprint image with or no horizontal stripe exist in the fingerprint image.

Figure 5:
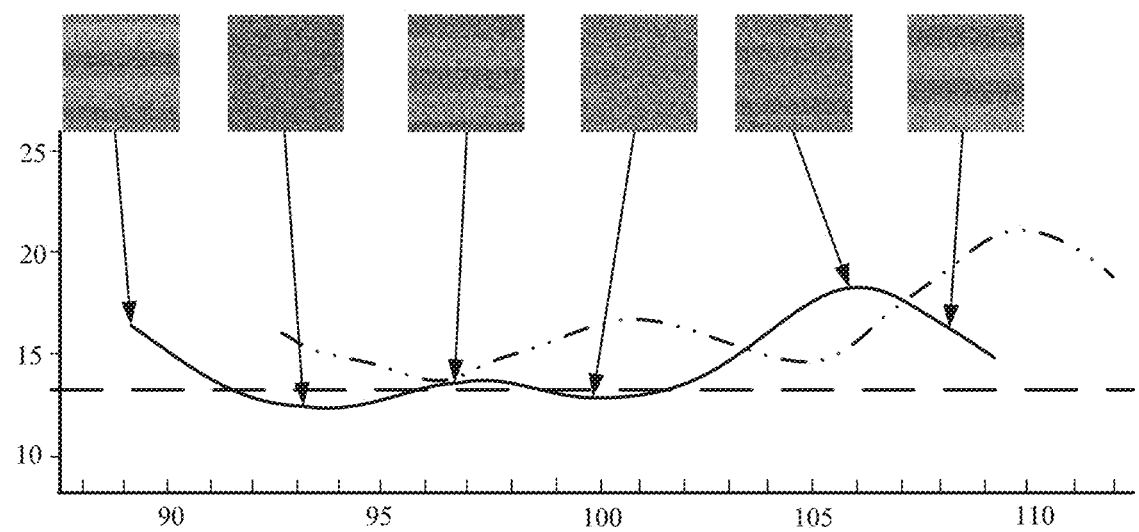
FIG. 5 is a distribution diagram of feature parameters of different combinations of fingerprint sensors plus display screens.

FIG. 5 shows a distribution of feature parameters of different combinations of fingerprint sensors plus display screens. The abscissa represents exposure times, the ordinate represents noise intensities, and different curves represent different combinations. Horizontal stripes of a same combination appear, disappear, reappear, and disappear with fluctuations of the curve. Generally, the clock offset is constant (always faster or always slower with a constant offset degree), so that it is only necessary to choose an exposure time corresponding to a point without stripes or with weakest stripes in a combination of fingerprint sensor plus display screen, and then, an optimal exposure time of the fingerprint sensor plus display screen is found.

Embodiments of the present disclosure will be described below with the feature parameter being a temporal noise, a spatial noise, and a horizontal stripe intensity respectively as an example.

In an embodiment, the feature parameter includes a temporal noise, and the controlling the fingerprint sensor to capture the at least one frame of image based on each candidate exposure time among the N candidate exposure times respectively includes: controlling the fingerprint sensor to capture M frames of images based on an i-th candidate exposure time among the N candidate exposure times, where M is a positive integer greater than 1, and i is a positive integer less than or equal to N; and the determining the N values of the feature parameter corresponding to the N candidate exposure times according to the at least one frame of image captured in each exposure time includes: acquiring a standard deviation of pixel values corresponding to a same fingerprint sensor pixel in the M frames of images; and determining a temporal noise value corresponding to the i-th candidate exposure time according to an average value of the standard deviations corresponding to P fingerprint sensor pixels, where P is a positive integer greater than 1.

Figure 6:
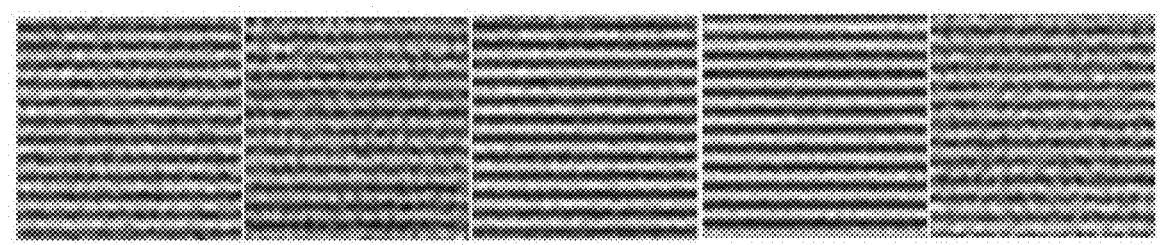
FIG. 6 is a schematic diagram of positions of horizontal stripes in a plurality of frames of images.

The fingerprint sensor can continuously capture 5 frames of images after a single press using a to-be-tested weight, and compute the temporal noise according to data of the 5 frames of images. Positions of the horizontal stripes appearing in the 5 frames of images are as shown in FIG. 6. As can be seen from FIG. 6, the horizontal stripes appear at random positions, i.e., horizontal stripes between a plurality of frames of images are not aligned. The more the clock offset is, the larger the stripe amplitude is, and the larger the temporal noise is.

Figure 7:
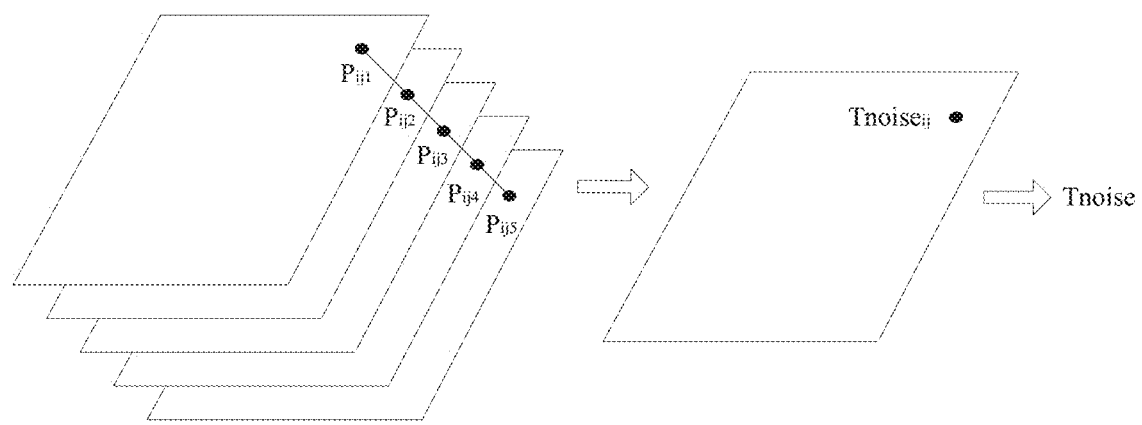
FIG. 7 is a schematic diagram of computing a temporal noise.

As shown in FIG. 7, $P_{i,j1}$ represents a pixel value of an i-th row and a j-th column of a 1st frame, $P_{i,j2}$ represents a pixel value of an i-th row and a j-th column of a 2nd frame, $P_{i,j3}$ represents a pixel value of an i-th row and a j-th column of a 3rd frame, $P_{i,j4}$ represents a pixel value of an i-th row and a j-th column of a 4th frame, and $P_{i,j5}$ represents a pixel value of an i-th row and a j-th column of a 5th frame. A temporal noise value obtained in a candidate exposure time can be computed as per the following equation:

$$Tnoise_{i,j} = std(P_{i,j1} \sim P_{i,j5}) \quad (1)$$

$$Tnoise = mean(Tnoise_{i,j}) \quad (2)$$

std represents a standard deviation function, and mean represents a mean function.

In another embodiment, the feature parameter includes a spatial noise, and the controlling the fingerprint sensor to capture the at least one frame of image based on each candidate exposure time among the N candidate exposure times respectively includes: controlling the fingerprint sensor to capture M frames of images based on an i-th candidate exposure time among the N candidate exposure times, where M is a positive integer greater than 1, and i is a positive integer less than or equal to N; and the determining the N values of the feature parameter corresponding to the N candidate exposure times according to the at least one frame of image captured in each exposure time includes: acquiring an average value of pixel values corresponding to a same fingerprint sensor pixel in the M frames of images; and determining a spatial noise value corresponding to the i-th candidate exposure time according to a standard deviation of the average values corresponding to P fingerprint sensor pixels, where P is a positive integer greater than 1.

Figure 8:
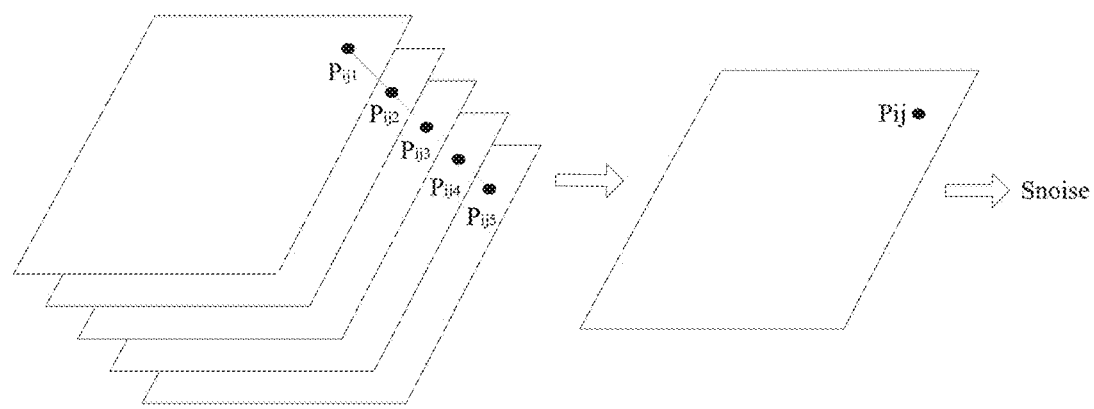
FIG. 8 is a schematic diagram of computing a spatial noise.

Similarly, the fingerprint sensor can continuously capture 5 frames of images after a single press using a to-be-tested weight, and compute the spatial noise according to data of the 5 frames of images. As shown in FIG. 8, $P_{i,j1}$ represents a pixel value of an i-th row and a j-th column of a 1st frame, $P_{i,j2}$ represents a pixel value of an i-th row and a j-th column of a 2nd frame, $P_{i,j3}$ represents a pixel value of an i-th row and a j-th column of a 3rd frame, $P_{i,j4}$ represents a pixel value of an i-th row and a j-th column of a 4th frame, and $P_{i,j5}$ represents a pixel value of an i-th row and a j-th column of a 5th frame.

A spatial noise value obtained in a candidate exposure time can be computed as per the following equation:

$$P_{i,j} = mean(P_{i,j1} \sim P_{i,j5}) \quad (3)$$

$$Snoise = std(P_{i,j}) \quad (4)$$

std represents a standard deviation function, and mean represents a mean function.

Figure 9:
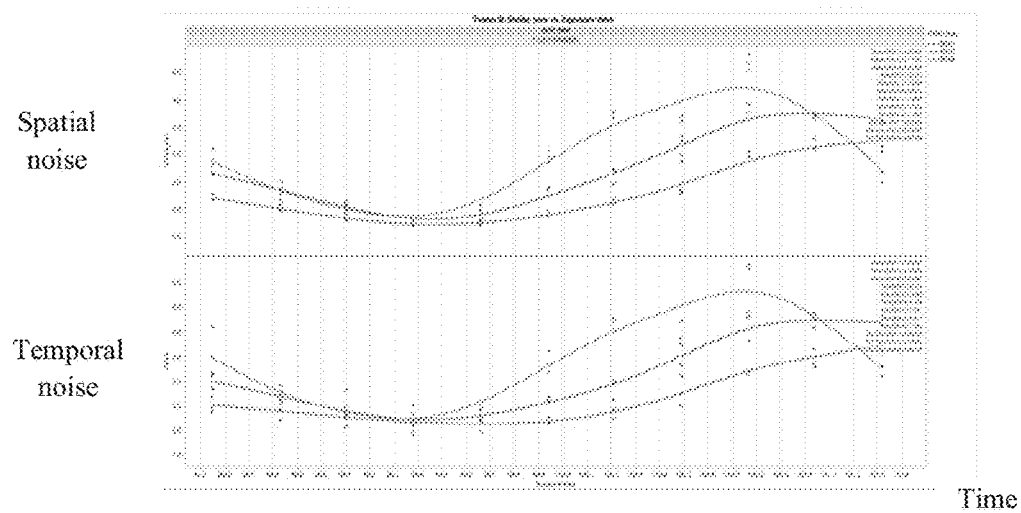
FIG. 9 is a distribution diagram of temporal noises and spatial noises in different exposure times.

FIG. 9 shows a distribution diagram of temporal noises and spatial noises in different exposure times. The horizontal axis is time, and the longitudinal axis is noise intensity. Different curves represent noise distributions of different combinations of fingerprint sensors plus display screens.

Optionally, the P fingerprint sensor pixels may be all pixels or some pixels of the fingerprint sensor.

In another embodiment, the feature parameter includes a horizontal stripe intensity, and the controlling the fingerprint sensor to capture the at least one frame of image based on each candidate exposure time among the N candidate exposure times respectively includes: controlling the fingerprint sensor to capture Q frames of images based on an i-th candidate exposure time among the N candidate exposure times, where Q is a positive integer, and i is a positive integer less than or equal to N; and the determining the N values of the feature parameter corresponding to the N candidate exposure times according to a plurality of frames of images captured in each exposure time includes: determining a horizontal stripe intensity value corresponding to the i-th candidate exposure time according to peak-to-peak values of a plurality of fingerprint sensor pixels in each frame of image among the Q frames of images.

That is, the peak-to-peak values of the fingerprint sensor pixels in each frame of image can be used to quantify the horizontal stripe intensity. For example, the peak-to-peak values of all fingerprint sensor pixels in each frame of image, i.e., a difference between a maximum pixel value and a minimum pixel value, can be computed, and then an average value of peak-to-peak values of all frames can be computed.

It should be understood that the feature parameters in embodiments of the present disclosure should include, but are not limited to, the feature parameters shown in the above examples, as long as they can indicate a degree of influence of the refresh period of the display screen on the fingerprint image captured by the fingerprint sensor.

It should be further understood that the more the image frames are captured in each candidate exposure time, the more accurate the values of the feature parameters are obtained, but the more the image frames are captured, the lower the fingerprint capture efficiency is. In order to balance between the accuracy and capture efficiency, preferably, 5 frames of images may be captured in each candidate exposure time.

Optionally, in an embodiment of the present disclosure, the preset step size for determining the N candidate exposure times may be a time difference between times of completing exposure of any two adjacent rows of fingerprint sensor pixels of the fingerprint sensor or a time difference between times of starting exposure of any two adjacent rows of fingerprint sensor pixels of the fingerprint sensor. Or, the preset step size may be a data reading time of one row of fingerprint sensor pixels.

It should be noted that in embodiments of the present disclosure, first, the N candidate exposure times may be determined, and then the fingerprint sensor can be controlled to perform exposure sequentially in the N candidate exposure times; or when a candidate exposure time is determined each time, the fingerprint sensor is controlled in the candidate exposure time to perform exposure, and then a next candidate exposure time is determined. When the latter solution is used, a test can be carried out in a shorter candidate exposure time, and a better exposure time can be selected.

Optionally, in embodiments of the present disclosure, the technical solutions of the embodiments of the present disclosure can be adopted at fixed intervals to select the target exposure time, so that the horizontal stripes can be weakest or eliminated as much as possible, to improve fingerprint identification performance.

Figure 10:
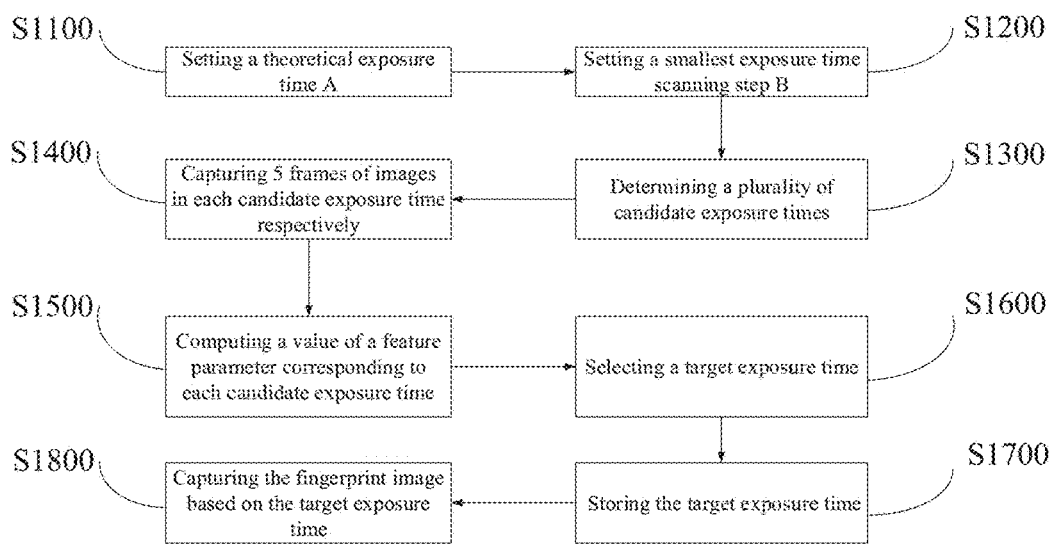
FIG. 10 is a schematic flowchart of a method for capturing a fingerprint image according to an embodiment of the present disclosure.

FIG. 10 shows a schematic flowchart of a method for capturing a fingerprint image in an embodiment of the present disclosure. As shown in FIG. 10, the method mainly includes:

S1100: setting a theoretical exposure time A, i.e., the preset exposure time mentioned above;

S1200: setting a smallest exposure time scanning step B, i.e., the preset step size mentioned above;

S1300: sequentially determining a plurality of candidate exposure times centered on A and with a multiple of B as a step size, for example, A−2B, A−B, A, A+B, and A+2B;

S1400: capturing 5 or more frames of data of a to-be-tested weight in each candidate exposure time respectively and storing the data;

S1500: computing a value of a feature parameter corresponding to each candidate exposure time, and annotating and ranking values of the feature parameter corresponding to a plurality of candidate exposure times, for example, values of the feature parameter corresponding to A−2B, A−B, A, A+B, and A+2B being C1, C2, C3, C4, and C5, respectively;

S1600: selecting a candidate exposure time corresponding to an optimal value of the feature parameter from the plurality of values of the feature parameter computed in S1500 as a target exposure time of a fingerprint sensor, where the optimal value of the feature parameter refers to a smallest degree of influence of a refresh period of a display screen on a fingerprint image captured by the fingerprint sensor, in other words, the optimal value of the feature parameter refers to an exposure time with weakest horizontal stripes or without horizontal stripes. For example, when the feature parameter is a temporal noise, a spatial noise, or a horizontal stripe intensity, the optimal value of the feature parameter refers to a smallest value among the plurality of values of the feature parameter computed in S1500. For example, when the feature parameter is a signal to noise ratio, the optimal value of the feature parameter refers to a largest value among the plurality of values of the feature parameter computed in S1500. For example, when the optimal value of the feature parameter is C2, a candidate exposure time A−B corresponding to it is the target exposure time.

S1700: writing the target exposure time A−B into a memory of an electronic device.

S1800: controlling the fingerprint sensor to capture the fingerprint image based on the target exposure time A−B.

Figure 11:
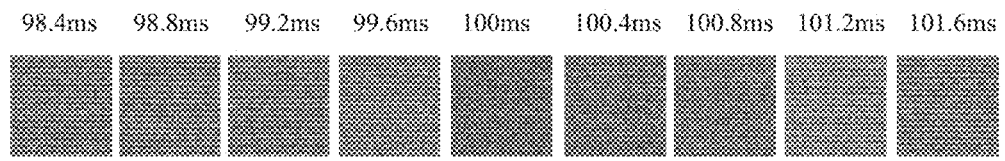
FIG. 11 is a schematic diagram of a fingerprint image captured in a group of candidate exposure times obtained based on the method for capturing a fingerprint image according to an embodiment of the present disclosure.

FIG. 11 is a fingerprint image captured in a group of candidate exposure times obtained from a technical solution of an embodiment of the present disclosure. In the figure, a center value of the exposure times is 100 ms, i.e., the preset exposure time is 100 ms. Table 1 shows a corresponding relationship between this group of exposure times and stripe noise values, where the stripe noise values may be temporal noise values, spatial noise values, stripe intensity values, or other noise values.

Figure 12:
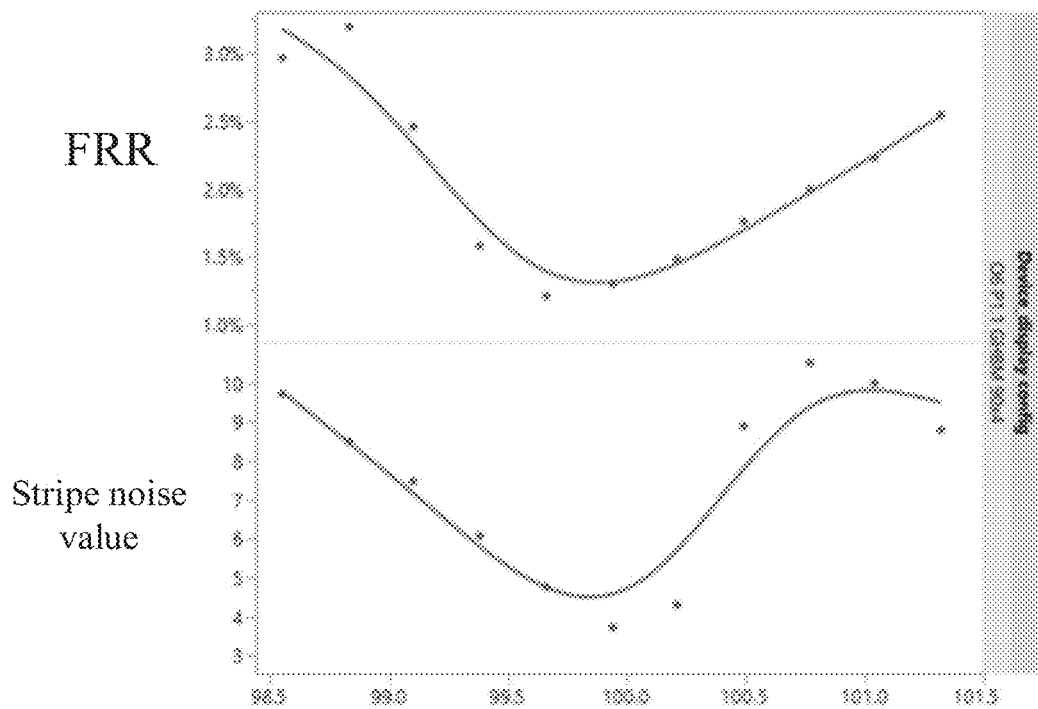
FIG. 12 is a graph of FRRs of a whole machine and a graph of stripe noises in a group of candidate exposure times.

FIG. 12 shows a graph of False Reject Rates (FRR) of a real finger of a whole machine and a graph of stripe noises in the above group of candidate exposure times. As can be seen from the results in the figure, an exposure time corresponding to a smallest stripe noise value is selected as a target exposure time. The lower the FRR is, the better the performance is, and the higher the success rate of unlocking is. That is, the smaller the stripe noise value corresponding to a selected exposure time is, the better the whole machine performance can be obtained.

The method for capturing a fingerprint image according to the embodiments of the present disclosure is described in detail above, and an apparatus for capturing a fingerprint image according to an embodiment of the present disclosure will be described below with reference to FIG. 13. The technical features described in the method embodiments are applicable to the apparatus embodiments below.

Figure 13:
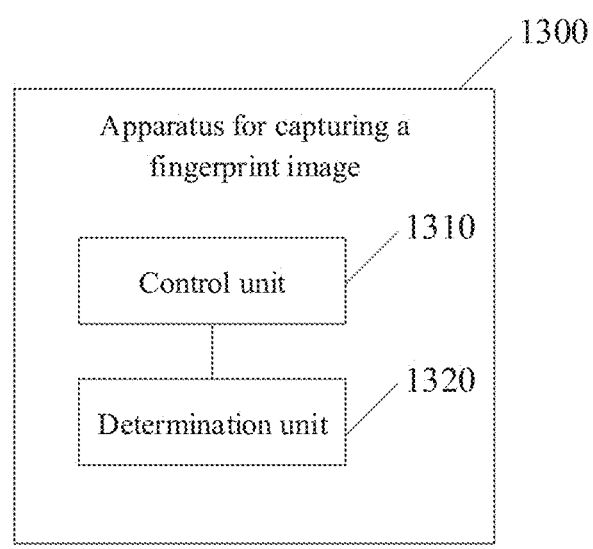
FIG. 13 is a schematic block diagram of an apparatus for capturing a fingerprint image according to an embodiment of the present disclosure.

FIG. 13 shows a schematic block diagram of an apparatus 1300 for capturing a fingerprint image in an embodiment of the present disclosure. As shown in FIG. 13, the apparatus 1300 includes:

a control unit 1310 configured to control a fingerprint sensor to capture at least one frame of image based on each candidate exposure time among N candidate exposure times respectively, the N candidate exposure times including a first exposure time greater than a preset exposure time, a second exposure time shorter than the preset exposure time, and the preset exposure time, where a difference between the first exposure time and the preset exposure time and a difference between the preset exposure time and the second exposure time are each a positive integer multiple of a preset step size and less than the preset exposure time, and N is a positive integer greater than or equal to 3; and a determination unit 1320 configured to determine N values of a feature parameter corresponding to the N candidate exposure times according to the at least one frame of image captured in each exposure time, where the feature parameter is used to indicate a degree of influence of a refresh period of a display screen on the fingerprint image captured by the fingerprint sensor; and determine a candidate exposure time corresponding to a first value indicating a smallest degree of influence among the N values as a target exposure time.

The control unit 1310 is further configured to:

control the fingerprint sensor to capture the fingerprint image based on the target exposure time.

TABLE 1

| | Candidate exposure time | | | | | | | | |
|---|---|---|---|---|---|---|---|---|---|
| | 98.4 ms | 98.8 ms | 99.2 ms | 99.6 ms | 100 ms | 100.4 ms | 100.8 ms | 101.2 ms | 101.6 ms |
| Stripe noise value | 7.4378 | 9.2556 | 9.1282 | 7.4463 | 4.4589 | 4.4279 | 4.1885 | 7.5644 | 9.1670 |

As can be seen from Table 1, the stripe noise value at 100.4 ms is higher than the stripe noise value at 100 ms, showing that the clock is actually slow, and 100.4 ms is closer to an actual value of the clock. The exposure time of 100.8 ms corresponding to the smallest value of 4.1885 can be considered as an optimal exposure time among the 9 candidate exposure times shown in Table 1, and this optimal exposure time can be determined as the target exposure time.

Optionally, in an embodiment of the present disclosure, the feature parameter includes at least one of: a temporal noise, a spatial noise, a signal to noise ratio, and a horizontal stripe intensity.

Optionally, in an embodiment of the present disclosure, the feature parameter includes a temporal noise, and the control unit 1310 is specifically configured to: control the fingerprint sensor to capture M frames of images based on an i-th candidate exposure time among the N candidate exposure times, where M is a positive integer greater than 1, and i is a positive integer less than or equal to N; acquire a standard deviation of pixel values corresponding to a same fingerprint sensor pixel in the M frames of images; and determine a temporal noise value corresponding to the i-th candidate exposure time according to an average value of the standard deviations corresponding to P fingerprint sensor pixels, where P is a positive integer greater than 1.

Optionally, in an embodiment of the present disclosure, the feature parameter includes a spatial noise, and the control unit 1310 is specifically configured to: control the fingerprint sensor to capture M frames of images based on an i-th candidate exposure time among the N candidate exposure times, where M is a positive integer greater than 1, and i is a positive integer less than or equal to N; acquire an average value of pixel values corresponding to a same fingerprint sensor pixel in the M frames of images; and determine a spatial noise value corresponding to the i-th candidate exposure time according to a standard deviation of the average values corresponding to P fingerprint sensor pixels, where P is a positive integer greater than 1.

Optionally, in an embodiment of the present disclosure, the feature parameter includes a horizontal stripe intensity, and the control unit 1310 is specifically configured to: control the fingerprint sensor to capture Q frames of images based on an i-th candidate exposure time among the N candidate exposure times, where Q is a positive integer, and i is a positive integer less than or equal to N; and determine a horizontal stripe intensity value corresponding to the i-th candidate exposure time according to peak-to-peak values of a plurality of fingerprint sensor pixels in each frame of image among the Q frames of images.

Optionally, in an embodiment of the present disclosure, the first value is a smallest value among the N values.

Optionally, in an embodiment of the present disclosure, the feature parameter includes a signal to noise ratio, and the first value is a largest value among the N values.

Optionally, in an embodiment of the present disclosure, the preset step size includes a time difference between times of completing exposure of two adjacent rows of fingerprint sensor pixels of the fingerprint sensor or a time difference between times of starting exposure of two adjacent rows of fingerprint sensor pixels of the fingerprint sensor.

Optionally, in an embodiment of the present disclosure, the at least one frame of image is 5 frames of images.

Optionally, in an embodiment of the present disclosure, the apparatus and the fingerprint sensor are encapsulated together.

Figure 14:
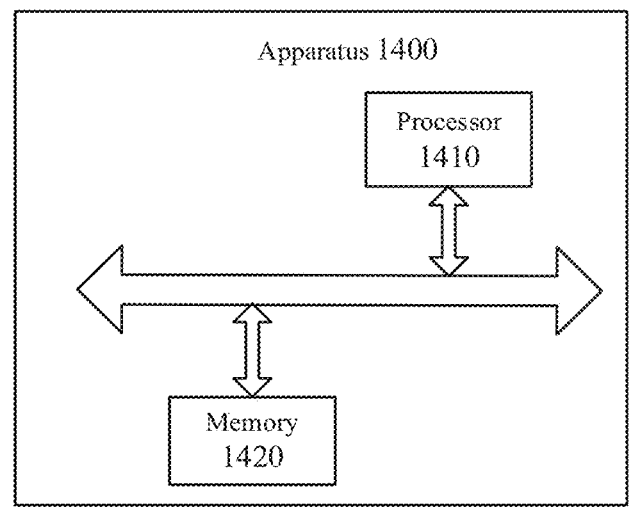
FIG. 14 is another schematic block diagram of the apparatus for capturing a fingerprint image according to an embodiment of the present disclosure.

FIG. 14 shows a schematic structural diagram of another apparatus 1400 for capturing a fingerprint image in an embodiment of the present disclosure. The apparatus 1400 for capturing a fingerprint image shown in FIG. 14 comprises a processor 1410, where the processor 1410 may invoke and run a computer program from a memory, to implement the method in embodiments of the present disclosure.

Optionally, as shown in FIG. 14, the apparatus 1400 for capturing a fingerprint image may further comprise a memory 1420. The processor 1410 may invoke and run the computer program from the memory 1420, to implement the method in the embodiments of the present disclosure.

The memory 1420 may be a stand-alone device independent of the processor 1410, or may be integrated into the processor 1410.

Optionally, the apparatus 1400 for capturing a fingerprint image may specifically be the apparatus 1300 for capturing a fingerprint image according to an embodiment of the present disclosure, and the apparatus 1400 for capturing a fingerprint image can implement the corresponding processes implemented by the apparatus 1300 for capturing a fingerprint image in various methods of the embodiments of the present disclosure. For the sake of conciseness, the description will not be repeated here.

An embodiment of the present disclosure further provides a chip, comprising a processor. The processor may invoke and run a computer program from a memory, to implement the method in the embodiments of the present disclosure.

Optionally, the chip can be applied to the apparatus for capturing a fingerprint image according to an embodiment of the present disclosure, and the chip can implement the corresponding processes implemented by the apparatus for capturing a fingerprint image in various methods of the embodiments of the present disclosure. For the sake of conciseness, the description will not be repeated here.

It should be understood that the chip mentioned in embodiments of the present disclosure may also be referred to as, e.g., a system chip or a system-on-chip.

Optionally, an embodiment of the present disclosure further provides a computer-readable medium configured to store a computer program, to implement the method in the embodiments of the present disclosure.

An embodiment of the present disclosure further provides an electronic device, comprising a display screen, a fingerprint sensor, and any one the above apparatuses for capturing a fingerprint image.

The fingerprint sensor is configured to be arranged under the display screen.

Figure 15:
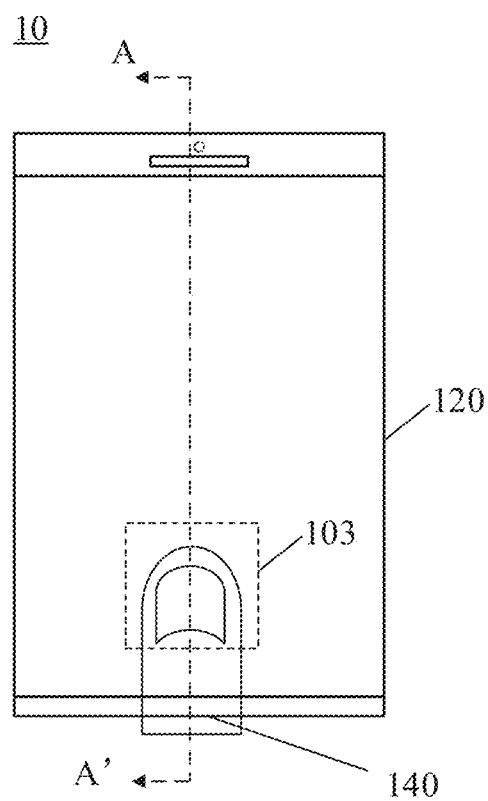
FIG. 15 is a directional view of an electronic device according to an embodiment of the present disclosure.
Figure 16:
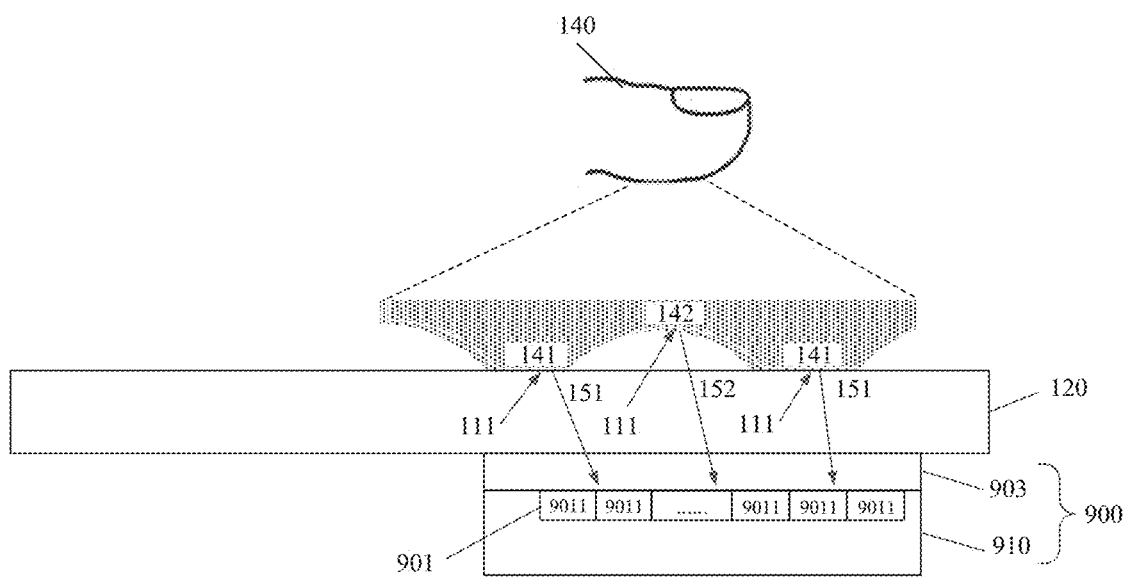
FIG. 16 is a schematic diagram of a partial sectional structure along A-A' of the electronic device shown in FIG. 15.

FIG. 15 and FIG. 16 show schematic diagrams of an electronic device 10 to which an under-screen fingerprint identification technology can be adapted, where FIG. 15 is a schematic front view of the electronic device 10, and FIG. 16 is a schematic diagram of a partial sectional structure along A-A' of the electronic device 10 shown in FIG. 15. The electronic device 10 comprises a display screen 120, an ambient light sensor arranged under the display screen 120, and a fingerprint sensor 900. The electronic device 10 further comprises any one of the above apparatuses for capturing a fingerprint image, where the apparatus for capturing a fingerprint image can be encapsulated together with the fingerprint sensor 900, or the apparatus for capturing a fingerprint image is a processor independent of the fingerprint sensor 900, for example, a main control processor of the electronic device.

As shown in FIG. 16, the fingerprint sensor 900 includes a light detecting portion 910 and an optical path guiding structure 903. The optical path guiding structure 903 is arranged above the light detecting portion 910. The light detecting portion 910 comprises, e.g., a pixel array 901 composed of a plurality of pixels 9011, and a control circuit 902 connected to the pixel array 901. As shown in FIG. 11, a region where the pixel array 901 is located or its sensing region is a fingerprint detection region 103 of the fingerprint sensor 900. The optical path guiding structure 903 is configured to guide an optical signal returned from a finger on the fingerprint detection region 103 to the pixel array 901.

The optical path guiding structure 903 in the fingerprint sensor 900 is not limited in the embodiments of the present disclosure in any way. For example, the optical path guiding structure 903 may comprise a microlens array composed of a plurality of microlenses. Further, at least one light blocking layer may be further provided under the microlens array, where each light blocking layer is provided with a plurality of openings corresponding to the plurality of microlenses respectively, and the pixel array 901 comprises a plurality of pixels 9011 corresponding to the plurality of microlenses. Each microlens is configured to converge an optical signal returned from the finger to corresponding openings in each light blocking layer, so that the optical signals sequentially pass through the corresponding openings in each light blocking layer, and are transmitted to corresponding pixels 9011 in the pixel array 901.

For another example, the optical path guiding structure 903 may comprise a collimator layer made on a semiconductor silicon wafer, and has a plurality of collimating units or a micropore array, where the collimating units may be micropores.

For another example, the optical path guiding structure 903 may comprise an optical lens layer having one or more lens units, where the lens unit may be a lens group composed of one or more aspherical lenses. For example, as shown in FIG. 12, the optical path guiding structure may include a lens 9031. Light emitted from a light emitting layer 1201 in the display screen radiates the finger, and light returned from the finger can be converged to a pixel array 901 of an optical fingerprint sensor through the lens 9031.

During fingerprint detection, the display screen 120 emits a beam of light 111 to the finger 140 above the fingerprint detection region 103, and the light 111 is reflected on a surface of the finger 140 to form reflected light or is scattered through the inside of the finger 140 to form scattered light. Because a ridge 141 and a valley 142 of a fingerprint have different light reflective powers, reflected light 151 from the ridge of the fingerprint and reflected light 152 from the valley of the fingerprint have different light intensities. After passing through the optical path guiding structure 903, the reflected light is received by the pixel array 901 and converted into a corresponding electrical signal, i.e., a fingerprint detection signal. Based on the fingerprint detection signal, data of the fingerprint image can be obtained, and is further used for fingerprint matching and verification, thus realizing an optical fingerprint detection function in the electronic device 10.

Further, the electronic device 10 may further comprise an excitation light source for fingerprint detection.

The display screen 120 may be a display screen having a self-luminous display unit, for example, an organic light-emitting diode (OLED) display screen or a micro-LED display screen. Taking the OLED display screen as an example, the fingerprint sensor 900 can use a display unit located in a fingerprint detection region 103 of the OLED display screen 120 as the excitation light source for optical fingerprint detection.

As an example and non-restrictively, the electronic device in an embodiment of the present disclosure may be a portable or mobile computing device, such as a terminal device, a mobile phone, a tablet computer, a notebook computer, a desktop computer, a game device, a vehicle electronic device, or a wearable smart device, or may be other electronic devices, such as an electronic database, an automobile, or an automated teller machine (ATM) of a bank. The wearable smart device includes a device that has full functions and a large size, and can realize complete or partial functions without relying on a smart phone, such as a smart watch or smart glasses, and includes a device that only focuses on a certain type of application functions and needs to be used in cooperation with other devices such as a smart phone, such as various smart bracelets and smart jewelries for monitoring physical signs.

As will be appreciated by those of ordinary skills in the art, the example units and algorithm steps described with reference to the embodiments disclosed herein can be implemented by electronic hardware, or by a combination of computer software and electronic hardware. Whether these functions are executed by hardware or software depends on specific applications and design constraints of the technical solutions. Those skilled in the art may implement described functions for each specific application using different methods, but such implementation should not be considered as falling beyond the scope of the present disclosure.

Those skilled in the art can clearly understand that, for convenience and simplicity of description, corresponding processes in the above method embodiments may be referred to for specific working process of the above described system, apparatus, and units, which will not be repeated here.

It should be understood that the system, apparatus, and method disclosed in the embodiments of the present disclosure may be implemented by other approaches. For example, the apparatus embodiments described above are merely illustrative. For example, the division of the units is only a logical function division and there may be other manners of division during actual implementations. For example, a plurality of units or components may be combined or may be integrated into another system, or some features may be omitted or may not be performed. In addition, the illustrated or discussed coupling or direct coupling or communicative connection between each other may be indirect coupling or communicative connection among apparatuses or units via some interfaces, and may be electrical connection, mechanical connection, or other forms of connection.

The units described as separate components may or may not be physically separated, the components illustrated as units may or may not be physical units, that is, they may be in the same place or may be distributed to a plurality of network units. Some or all of the units may be selected according to actual requirements to achieve the purpose of the solutions of the present embodiment.

In addition, the functional units in various embodiments of the present disclosure may be integrated into one processing unit, or each unit may be physically present alone, or two or more than two units may be integrated into one unit.

The unit may be stored in a computer-readable storage medium when it is implemented in the form of a software functional unit and is sold or used as a separate product. Based on such understanding, the technical solutions of the present disclosure essentially, or a part of the technical solutions that contributes to the prior art, or the part of the technical solutions, may be embodied in the form of a software product which is stored in a storage medium and includes some instructions for causing a computer device (which may be, e.g., a personal computer, a server, or a network device) to perform all or some of the steps described in the embodiments of the present disclosure. The above storage mediums include: various mediums that can store program code, such as a U disk, a mobile hard disk, a read-only memory (ROM), a random access memory (RAM), a magnetic disk, or an optical disk.

While the above description merely provides specific embodiments of the present disclosure, the scope of protection of the present disclosure is not limited to the specific embodiments. Any person skilled in the present technical field can easily conceive of variations or replacements within the technical scope disclosed in the present disclosure. All variations or replacements should be encompassed within the scope of protection of the present disclosure.

Therefore, the scope of protection of the present disclosure should be determined by the scope of protection of the appended claims.

What is claimed is:

1. A method for capturing a fingerprint image, comprising:
controlling a fingerprint sensor to capture at least one frame of image based on each candidate exposure time among N candidate exposure times respectively, the N candidate exposure times comprising a first exposure time greater than a preset exposure time, a second exposure time shorter than the preset exposure time, and the preset exposure time, wherein a difference between the first exposure time and the preset exposure time and a difference between the preset exposure time and the second exposure time are each a positive integer multiple of a preset step size and less than the preset exposure time, and N is a positive integer greater than or equal to 3;
determining N values of a feature parameter corresponding to the N candidate exposure times according to the at least one frame of image captured in the each exposure time, wherein the feature parameter is used to indicate a degree of influence of a refresh period of a display screen on the fingerprint image captured by the fingerprint sensor;
determining a candidate exposure time corresponding to a first value indicating a smallest degree of influence among the N values as a target exposure time; and
controlling the fingerprint sensor to capture the fingerprint image based on the target exposure time.

2. The method according to claim 1, wherein the feature parameter comprises at least one of: a temporal noise, a spatial noise, a signal to noise ratio, and a horizontal stripe intensity.

3. The method according to claim 1, wherein the feature parameter comprises a temporal noise, and the controlling the fingerprint sensor to capture the at least one frame of image based on each candidate exposure time among the N candidate exposure times respectively comprises:
controlling the fingerprint sensor to capture M frames of images based on an i-th candidate exposure time among the N candidate exposure times, wherein M is a positive integer greater than 1, and i is a positive integer less than or equal to N; and
the determining the N values of the feature parameter corresponding to the N candidate exposure times according to the at least one frame of image captured in the each exposure time comprises:
acquiring a standard deviation of pixel values corresponding to a same fingerprint sensor pixel in the M frames of images; and
determining a temporal noise value corresponding to the i-th candidate exposure time according to an average value of standard deviations corresponding to P fingerprint sensor pixels, wherein P is a positive integer greater than 1.

4. The method according to claim 1, wherein the feature parameter comprises a spatial noise, and the controlling the fingerprint sensor to capture the at least one frame of image based on each candidate exposure time among the N candidate exposure times respectively comprises:
controlling the fingerprint sensor to capture M frames of images based on an i-th candidate exposure time among the N candidate exposure times, wherein M is a positive integer greater than 1, and i is a positive integer less than or equal to N; and
the determining the N values of the feature parameter corresponding to the N candidate exposure times according to the at least one frame of image captured in the each exposure time comprises:
acquiring an average value of pixel values corresponding to a same fingerprint sensor pixel in the M frames of images; and
determining a spatial noise value corresponding to the i-th candidate exposure time according to a standard deviation of average values corresponding to P fingerprint sensor pixels, wherein P is a positive integer greater than 1.

5. The method according to claim 1, wherein the feature parameter comprises a horizontal stripe intensity, and the controlling the fingerprint sensor to capture the at least one frame of image based on each candidate exposure time among the N candidate exposure times respectively comprises:
controlling the fingerprint sensor to capture Q frames of images based on an i-th candidate exposure time among the N candidate exposure times, wherein Q is a positive integer, and i is a positive integer less than or equal to N; and
the determining the N values of the feature parameter corresponding to the N candidate exposure times according to the at least one frame of image captured in the each exposure time comprises:
determining a horizontal stripe intensity value corresponding to the i-th candidate exposure time according to peak-to-peak values of a plurality of fingerprint sensor pixels in each frame of image among the Q frames of images.

6. The method according to claim 1, wherein the feature parameter comprises at least one of a temporal noise, a spatial noise and a horizontal stripe intensity, and the first value is a smallest value among the N values.

7. The method according to claim 1, wherein the feature parameter comprises a signal to noise ratio, and the first value is a largest value among the N values.

8. The method according to claim 1, wherein the preset step size comprises a time difference between times of completing exposure of two adjacent rows of fingerprint sensor pixels of the fingerprint sensor or a time difference between times of starting exposure two adjacent rows of fingerprint sensor pixels of the fingerprint sensor.

9. The method according to claim 1, wherein the at least one frame of image is 5 frames of images.

10. An apparatus for capturing a fingerprint image, comprising: a processor configured to:
control a fingerprint sensor to capture at least one frame of image based on each candidate exposure time among N candidate exposure times respectively, the N candidate exposure times comprising a first exposure time greater than a preset exposure time, a second exposure time shorter than the preset exposure time, and the preset exposure time, wherein a difference between the first exposure time and the preset exposure time and a difference between the preset exposure time and the second exposure time are each a positive integer multiple of a preset step size and less than the preset exposure time, and N is a positive integer greater than or equal to 3;
determine N values of a feature parameter corresponding to the N candidate exposure times according to the at least one frame of image captured in the each exposure time, wherein the feature parameter is used to indicate a degree of influence of a refresh period of a display screen on the fingerprint image captured by the fingerprint sensor;

determine a candidate exposure time corresponding to a first value indicating a smallest degree of influence among the N values as a target exposure time; and control the fingerprint sensor to capture the fingerprint image based on the target exposure time.

11. The apparatus according to claim 10, wherein the feature parameter comprises at least one of: a temporal noise, a spatial noise, a signal to noise ratio, and a horizontal stripe intensity.

12. The apparatus according to claim 10, wherein the feature parameter comprises a temporal noise, and the processor is specifically configured to:

control the fingerprint sensor to capture M frames of images based on an i-th candidate exposure time among the N candidate exposure times, wherein M is a positive integer greater than 1, and i is a positive integer less than or equal to N;

acquire a standard deviation of pixel values corresponding to a same fingerprint sensor pixel in the M frames of images; and determine a temporal noise value corresponding to the i-th candidate exposure time according to an average value of standard deviations corresponding to P fingerprint sensor pixels, wherein P is a positive integer greater than 1.

13. The apparatus according to claim 10, wherein the feature parameter comprises a spatial noise, and the processor is specifically configured to:

control the fingerprint sensor to capture M frames of images based on an i-th candidate exposure time among the N candidate exposure times, wherein M is a positive integer greater than 1, and i is a positive integer less than or equal to N;

acquire an average value of pixel values corresponding to a same fingerprint sensor pixel in the M frames of images; and determine a spatial noise value corresponding to the i-th candidate exposure time according to a standard deviation of average values corresponding to P fingerprint sensor pixels, wherein P is a positive integer greater than 1.

14. The apparatus according to claim 10, wherein the feature parameter comprises a spatial noise, and the processor is specifically configured to:

control the fingerprint sensor to capture Q frames of images based on an i-th candidate exposure time among the N candidate exposure times, wherein Q is a positive integer, and i is a positive integer less than or equal to N; and determine a horizontal stripe intensity value corresponding to the i-th candidate exposure time according to peak-to-peak values of a plurality of fingerprint sensor pixels in each frame of image among the Q frames of images.

15. The apparatus according to claim 10, wherein the feature parameter comprises at least one of a temporal noise, a spatial noise and a horizontal stripe intensity, and the first value is a smallest value among the N values.

16. The apparatus according to claim 10, wherein the feature parameter comprises a signal to noise ratio, and the first value is a largest value among the N values.

17. The apparatus according to claim 10, wherein the preset step size comprises a time difference between times of completing exposure of two adjacent rows of fingerprint sensor pixels of the fingerprint sensor or a time difference between times of starting exposure of two adjacent rows of fingerprint sensor pixels of the fingerprint sensor.

18. The apparatus according to claim 10, wherein the at least one frame of image is 5 frames of images.

19. The apparatus according to claim 10, wherein the apparatus and the fingerprint sensor are encapsulated together.

20. An electronic device, comprising a display screen, a fingerprint sensor, and an apparatus for capturing a fingerprint image, wherein the fingerprint sensor is arranged under the display screen, and wherein the apparatus comprises a processor, the processor is configured to:

control the fingerprint sensor to capture at least one frame of image based on each candidate exposure time among N candidate exposure times respectively, the N candidate exposure times comprising a first exposure time greater than a preset exposure time, a second exposure time shorter than the preset exposure time, and the preset exposure time, wherein a difference between the first exposure time and the preset exposure time and a difference between the preset exposure time and the second exposure time are each a positive integer multiple of a preset step size and less than the preset exposure time, and N is a positive integer greater than or equal to 3;

determine N values of a feature parameter corresponding to the N candidate exposure times according to the at least one frame of image captured in the each exposure time, wherein the feature parameter is used to indicate a degree of influence of a refresh period of a display screen on the fingerprint image captured by the fingerprint sensor;

determine a candidate exposure time corresponding to a first value indicating a smallest degree of influence among the N values as a target exposure time; and control the fingerprint sensor to capture the fingerprint image based on the target exposure time.

* * * * *